United States Patent [19]

Rabensteiner et al.

[11] Patent Number: 4,730,497
[45] Date of Patent: Mar. 15, 1988

[54] DEFORMATION-MEASURING SENSOR

[75] Inventors: Klaus Rabensteiner, Arnoldstein; Peter Schubert, Salzburg; Johann Golser, Sterneckstrasse 55, A-5020 Salzburg; Georg Feder, Leoben, all of Austria

[73] Assignees: Erich Hackl; Johann Golser, both of Salsburg, Austria

[21] Appl. No.: 28,523

[22] Filed: Mar. 20, 1987

[30] Foreign Application Priority Data

Mar. 20, 1986 [AT] Austria .............................. A 748/86

[51] Int. Cl.$^4$ .............................................. G01N 3/00
[52] U.S. Cl. ............................................ 73/803; 73/768
[58] Field of Search ................. 73/768, 803, 760, 766, 73/784, 786, 818, 826

[56] References Cited

U.S. PATENT DOCUMENTS 3,052,116 9/1962 Critchley et al. ....................... 73/768

FOREIGN PATENT DOCUMENTS 210445 6/1968 U.S.S.R. ............................... 73/803

Primary Examiner—Jerry W. Myracle
Attorney, Agent, or Firm—Karl F. Ross; Herbert Dubno

[57] ABSTRACT

The measuring-value sensor according to the present invention for the measurement of extensions, for example in concrete or shotcrete, consists of a support member, having an extension stiffness value that is lower than the extension stiffness value of the material diameter displaced by the sensor. Transverse elements are located at either end of the support member, which induce the impact. By combining sufficiently large transverse elements that have a relatively high flexural strength and a support member that has the above-mentioned very low extension stiffness value it is made sure that extensions in the concrete are forced completely and without obstruction upon the support member by means of the transverse elements, so that when measuring the extension of the support member, the extension of the concrete is measured directly and without any distortion. The support member is suitably a hollow profile of aluminum or a plastic material, into which an additional profile, e.g. of steel, is slid, in order to obtain sufficient resistance to buckling.

8 Claims, 3 Drawing Figures

DEFORMATION-MEASURING SENSOR

FIELD OF THE INVENTION

The invention relates to a measuring-value sensor, consisting of a support member which can be loaded axially upon the deformation of an adjacent object whose deformation is to be measured, and of a sleeve surrounding the support member, as well as a minimum of two stiff transverse elements connected to the support member.

BACKGROUND OF THE INVENTION

In many cases, characteristics of a concrete structure are described by using Hooke's law. This approximation is justified in such cases where a concrete structure is exposed only to stresses that are small in relation to its present compressive strength and where the impact of loading sets in at a relatively late point in time. In case of early load impacts at high pressure levels, the rheological behavior of the material must also be considered in any static calculation.

It is known that, given certain conditions, concrete will present a clearly plastic deformation behavior, and that time-dependent deformations will sometimes amount to a multiple of the instantaneously occurring plastic deformations. For certain applications, for example when measuring characteristics of shotcrete layers in tunnel constructions, this fact is of essential significance for the results of the calculations and thus for the safety and economy of the structure.

On account of the many parameters that have an influence upon each other, the computing assumptions must be checked against measurements on the actual structure. The widest possible coverage of all deformations (e.g. extensions) at selected locations is of particular consequence in this connection.

It is known that extension measuring-value sensors with pipe-shaped deformation members, as support elements for extension-measuring strips, are used to measure extensions in concrete structures. As a rule, such sensors have a higher extension stiffness than the material column displaced by them, particularly when using steel pipes of small diameter. This prevents the lossfree transfer of extension deformation from the concrete to the support element of the extension-measuring strip.

It is also known from Federal German Patent DE-PS No. 3 101 575 that extension-measuring sensors can have hollow profiles as deformation members, where the cross-sectional surface, defined by the outer shape of the hollow profile, and the cross-sectional material surface of the hollow profile are chosen as a relation between the elasticity modulus of the material of the support member and the elasticity modulus of the concrete. This serves the purpose of obtaining an extension stiffness value for the sensor which equals the extension stiffness value of the displaced concrete so that the deformation properties within the range of the sensor are not varied, thereby preventing distortions of the transferred forces by the sensor.

With this construction, however, it must be borne in mind that the strength and deformation characteristics of a concrete will change in dependence upon time and stress. It is therefore possible only at one single point in time to obtain undistorted measuring values. This construction does therefore not permit measurement at an early point in time and does not take account of the time-dependent deformation parameters of the concrete. Also, creep extensions cannot be sensed without losses.

It is also known from German Democratic Republic Patent DD-PS-No. 141 710 to embody the support member as a curving bent sheet which is located in a straight sleeve. In this case, measurements can be taken only, if the bent sheet can curve without obstruction. The hollow space required for this purpose on one side runs the risk of becoming filled with moisture or water, especially when applied outdoors, in particular in connection with long-performance underground structures or under rough construction-site conditions. In the long run, this results in the risk of corrosion of the thin bent sheet, or its connections, and the risk of obstructing the free deformation of the bent sheet by ice or sinter forming in the course of time, which entails uncertainties, mainly in the event of long-term measurements outside the laboratory, without the possibility of repairing the damage.

With regard to the use of deformation sensors having a lower extension stiffness value than that of the material column displaced by it, experts in the field have maintained so far mainly that, on account of an impact upon the transferred forces in the area of measurement, correspondingly distorted values only are measured.

OBJECTS OF THE INVENTION

It is an object of the invention to provide an extension sensor having a very low extension stiffness value.

It is another object of the invention to provide an improved device for sensing extensions in measuring objects with a variable deformation behavior immediately after installation of the measuring device, e.g. in nonhardened concrete, eliminating at the same time any impact on the transferred forces in the vicinity of the support member of the measuring device which would distort the extension values to be measured.

It is also an object to provide an improved extension sensor which will avoid the risk of damage when casting or shooting it into the concrete and prevent an impact of any considerable extent upon the measuring results due to corrosion or penetrating moisture.

According to the invention, these objects are attained by providing the support member of a measuring sensor of the above-mentioned kind with an extension stiffness value that is lower than the product obtained from the circumscribed cross-sectional surface of the sleeve and the elasticity modulus of the measuring object.

In addition we provide for the length of a minimum of two transverse elements, measured at a right angle to the support-member axis, to be larger than the triple amount of the square root of the sleeve's cross-sectional surface.

The extension stiffness value of the support member is therefore lower than the extension stiffness value of that part of the measuring object which is within the measuring range of the measuring-value sensor. The mean value for the extension or compression of the support member represents directly the measuring value, and not the detour of an "unobstructed" bending.

The two transverse elements according to the invention make sure that the measured extensions are derived from an area within the measured object, with the extensions of the object not being affected by the support member of the measuring-value sensor. The combination of transverse elements with high flexural strength and a support member with lower extension stiffness value prevents the transverse elements from penetrating the concrete, which ensures that the extensions of the measuring object are forced upon the support member via the two transverse elements.

The transverse elements can be of any desired shape, e.g. rod-shaped or disc-shaped. They only need to be of such dimensions as to extend to an area beyond the rang of the support member.

Preferably however, the support member is embodied as a hollow profile made of aluminum. According to the invention, however, it is also possible to embody the support member of a plastic material, with the body possibly being embodied either as hollow or solid profile. The deviation of the tension-extension line from the straight line is of no significance in this connection, as long as there is no softening in the area of the deformations to be measured, i.e. as long as the gradient of the tension-extension line maintains its algebraic sign.

Whenever the support member is embodied as a hollow profile, the necessary buckling strength may easily be obtained (in spite of its lower extension stiffness) by sliding another profile of a material with high flexural strength, preferably steel, into the hollow profile, with the total length of that additional profile being less than that of the hollow profile of the support member. The additional profile prevents buckling, yet it may not affect any extension or compression of the hollow profile, since it is only slid into (and not connected to) the hollow profile and since it is also shorter than the hollow profile. The resulting hollow space is filled with elastic foam, which obstructs buckling, in relation to the directly (axially) applied crowding force, with a negligently small force.

Extension-measuring strips may be glued to the central part of the circumference of the support member in its longitudinal direction, in order to convey the extension of the support member. When using support members of a plastic material which has a constant lateral extension value over the entire measuring range, the longitudinal extension may also be established by measuring its lateral extension; according to the invention, extension-measuring strips are glued to the circumference of the central part of the support member for this purpose, which extend in the direction of its circumference and convey the extension.

Whenever the support member is embodied as a hollow profile, a string may be accommodated inside the hollow profile, in order to measure deformation according to the principle of the vibrating string.

Finally, the invention also allows for an inductive position sensor to be provided, in order to convey the extension within the support member.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
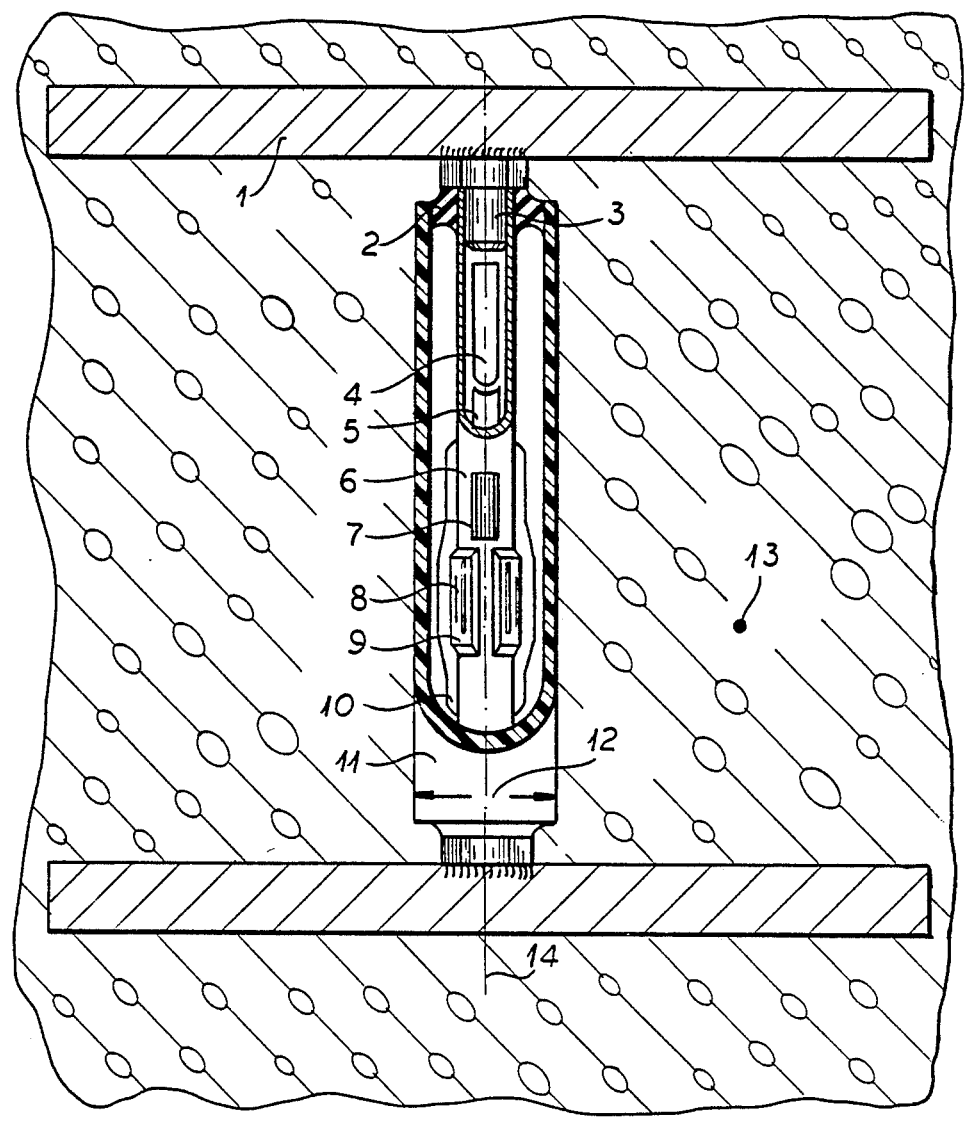
FIG. 1 is an axial cross sectional view of a measured value sensor for concrete deformation in place in a concrete body, in accordance with the invention, partly shown in elevation at the lower end thereof.

The length of support member 6 with straight axis 14 is determined in keeping with the measuring assignment; particularly when measuring non-homogeneous materials, a sufficient measuring length should be provided, in order to allow for the mean-value formation of the extension. The firm connection of the soft support member 6 to transverse elements 1, having a high flexural strength, ensures that only such extensions are forced upon support member 6 as are derived from an area of measuring object 13 that is not affected by the measuring device.

In order to prevent any buckling of the sensor, an additional profile 4, of a material with high flexural strength, preferably steel, is slid into the hollow profile of support member 6, which will prevent any conveyance of pressure in the longitudinal direction.

In the embodiment shown in FIG. 1, a short bolt 3 is firmly connected to transverse element 1. Transverse element 1 may, for example, be connected to support member 6 by gluing the shaft of bolt 3 into the hollow profile of support member 6. A profile 4 is located between bolts 3 at either end of the hollow profile of support member 5, the length of which is dimensioned in such a way as to leave an open gap between profile 4 and bolt 3.

This is necessary so as to allow the length of support member 6 to change without any obstruction, in keeping with the deformations forced upon it by the concrete. Profile 4 may also be covered by a plastic sleeve 5, in order to prevent the conveyance of any thrust on the circumference.

Extension-measuring strips 7 are applied to the circumference of the hollow profile of support member 6 in the longitudinal direction. Whenever the hollow profile of support member 6 consists of aluminum, it will, as a rule, not have a constant lateral extension value over the entire measuring range. Accordingly, no extension-measuring strips are provided laterally to the main direction of the extensions.

Temperature-compensated extension-measuring strips (e.g. forming a strain-gauge bridge circuit) may be used to compensate any undesired temperature influences. In the embodiment of FIG. 1, additional compensating extension-measuring strips 8 are glued to a platelet 9, which is made of the same material as support member 6, with there being no actuated connection to support member 6. Suitably, the extension-measuring strips are connected in the form of a Wheatstone bridge.

The extension-measuring strips, as well as all electric connections must be protected against water by means of a suitable, permanently plastic covering material 10. A strong plastic pipe 11, which covers a cross-sectional surface 12 with its outer shape, is slipped over support member 6, in order to protect it against mechanical damage. The remaining annular gap should preferably be filled with silicon rubber 2, as additional protection against penetrating water. The measuring cable may be led through this annular gap.

Figure 2:
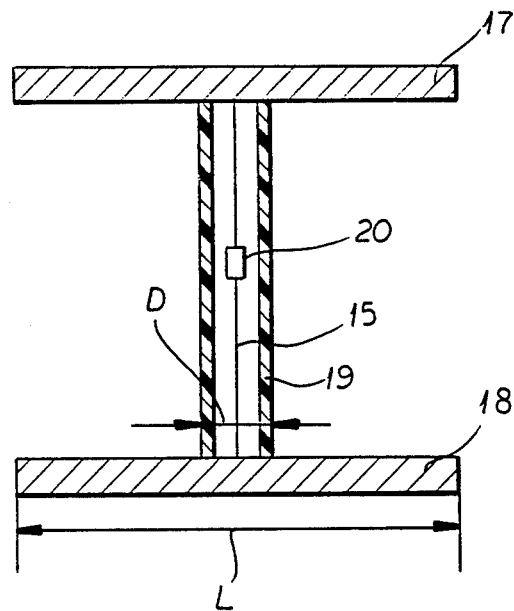
FIG. 2 is a cross sectional view through another sensor in accordance with the invention illustrating another embodiment thereof.

In FIG. 2, we have shown another embodiment of the invention in which the transverse elements 17 and 18, which have a higher stiffness than that of the sleeve 19 can be bars of lengths L where $$L = 3\sqrt{A},$$

where A is the cross sectional area of a cylinder of the diameter D of the sleeve or tube 19.

As in the embodiment previously described, the extension stiffness value of the support member constituted by the sleeve or tube 19, which is affixed at its ends to the transverse elements 17 and 18, is less than the product of the cylinder of concrete which is displaced by that tube and the modulus of elasticity of the concrete. In this case, however, the sensing element is a vibrating string 15 provided with a weight 20 which may include a vibration sensor responsive to the vibration of the weight and the string and thereby generate an output which is transmitted in the manner described, representing deformation of the concrete in which the device is embedded upon the application of an impact to the concrete.

Figure 3:
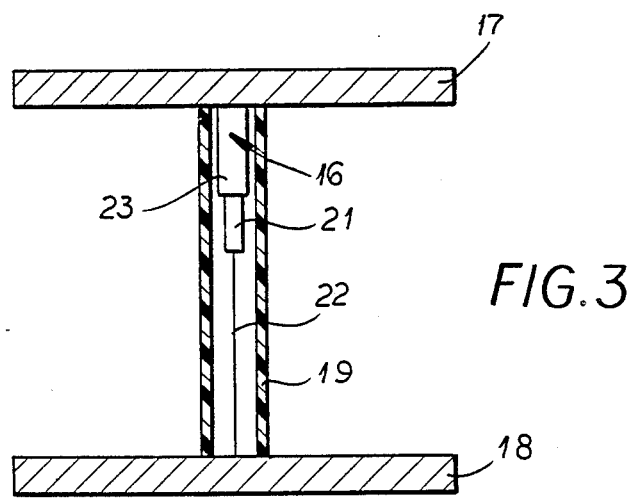
FIG. 3 is a view similar to FIG. 2 showing still another embodiment.

In the embodiment of FIG. 3, the elements 17, 18 and 19 correspond to those of FIG. 2, but the sensor for the extension utilizes inductive sensor principles, i.e. a linear differential transformer 16 whose movable member 21 is drawn against a spring force (not shown) by a wire 22 connected to element 18, with respect to a coil contained in a housing 23 affixed to the transverse element 17. The dimensions and conditions described in connection with FIG. 2 apply here except that the output is inductively generated utilizing the known principles of a linear differential transformer or any other inductive sensor.

We claim:

1. In a measured-value sensor consisting of a straight support member, which can be loaded in the axial direction on account of the deformation of the surrounding measuring object, and of a sleeve surrounding the support member, as well as of a minimum of two stiff transverse elements, which are connected to the support member, the improvement wherein:

the extension stiffness value of the support member is smaller than the product of the circumscribed surface of the sleeve cross section and the elasticity modulus of the measuring object, a minimum of two transverse elements is provided with a length measured at a right angle to the axis of the support member that is the triple amount of the square root of the cross-sectional surface of the sleeve.

2. The improvement defined in claim 1 wherein the support member is a hollow profile made of aluminum.

3. The improvement defined in claim 1 wherein the support member is composed of a plastic material.

4. The improvement defined in claim 3 wherein extension-measuring strips, glued to the circumference, are located in the central part of the support member in its longitudinal direction, in order to transmit any extension.

5. The improvement defined in claim 1 wherein another profile made of a material with a high flexural strength, preferably steel, is slid into the hollow profile of the support member, the total length of said other profile being less than that of the hollow profile of the support member.

6. The improvement defined in claim 1 wherein extension-measuring strips, glued to the circumference, are located in the central part of the support member in its longitudinal direction, in order to transmit any extension.

7. The improvement defined in claim 1 wherein a string is located inside the support member, in order to measure deformation on the basis of the principle of the vibrating string.

8. The improvement defined in claim 1 wherein inductive position sensors are located inside the support member, in order to transmit any extension.

* * * * *